US 8,675,779 B2

(12) United States Patent
Zeppetelle et al.

(10) Patent No.: US 8,675,779 B2
(45) Date of Patent: Mar. 18, 2014

(54) HARMONIC TRANSMISSION OF DATA

(75) Inventors: Robert Zeppetelle, Brainerd, MN (US); Stanley E. McHann, Jr., Crosslake, MN (US)

(73) Assignee: Landis+Gyr Technologies, LLC, Pequot Lakes, MN (US)

( * ) Notice: Subject to any disclaimer, the term of this patent is extended or adjusted under 35 U.S.C. 154(b) by 388 days.

(21) Appl. No.: 13/075,953

(22) Filed: Mar. 30, 2011

(65) Prior Publication Data
US 2012/0076212 A1 Mar. 29, 2012

Related U.S. Application Data

(60) Provisional application No. 61/387,061, filed on Sep. 28, 2010.

(51) Int. Cl.
H04L 27/06 (2006.01)

(52) U.S. Cl.
USPC .......................................... 375/340; 375/259

(58) Field of Classification Search
USPC .................................................. 375/340, 259
See application file for complete search history.

(56) References Cited

U.S. PATENT DOCUMENTS

| | | | |
|---|---|---|---|
| 3,582,782 A | 6/1971 | Danielsen | |
| 3,754,250 A | 8/1973 | Bruner | |
| 5,519,725 A | 5/1996 | Hershey et al. | |
| 5,581,229 A | 12/1996 | Hunt | |
| 6,154,488 A * | 11/2000 | Hunt | 375/219 |
| 6,177,884 B1 | 1/2001 | Hunt et al. | |
| 6,998,963 B2 | 2/2006 | Flen et al. | |
| 7,102,490 B2 | 9/2006 | Flen et al. | |
| 7,145,438 B2 | 12/2006 | Flen et al. | |
| 7,180,412 B2 | 2/2007 | Bonicatto et al. | |
| 7,184,861 B2 | 2/2007 | Petite | |
| 7,209,840 B2 | 4/2007 | Petite et al. | |
| 7,224,740 B2 | 5/2007 | Hunt | |
| 7,236,765 B2 | 6/2007 | Bonicatto et al. | |
| 7,313,193 B2 * | 12/2007 | Laroia | 375/267 |
| 7,346,463 B2 | 3/2008 | Petite et al. | |
| 7,432,824 B2 | 10/2008 | Flen et al. | |
| 7,443,313 B2 | 10/2008 | Davis et al. | |
| 7,468,661 B2 | 12/2008 | Petite et al. | |
| 7,606,298 B1 * | 10/2009 | Weber et al. | 375/224 |
| 7,609,784 B1 * | 10/2009 | Heistermann | 375/329 |
| 7,706,320 B2 | 4/2010 | Davis et al. | |
| 7,738,999 B2 | 6/2010 | Petite | |
| 7,742,393 B2 | 6/2010 | Bonicatto et al. | |
| 7,774,530 B2 | 8/2010 | Haug et al. | |
| 7,791,468 B2 | 9/2010 | Bonicatto et al. | |
| 7,877,218 B2 | 1/2011 | Bonicatto et al. | |
| 7,978,059 B2 | 7/2011 | Petite et al. | |
| 8,144,816 B2 | 3/2012 | Bonicatto et al. | |
| 8,144,820 B2 | 3/2012 | Bonicatto | |
| 8,194,789 B2 | 6/2012 | Wolter et al. | |
| 8,238,263 B2 | 8/2012 | Kohout et al. | |
| 2002/0196128 A1 | 12/2002 | Gaus, Jr. et al. | |
| 2003/0225893 A1 * | 12/2003 | Roese et al. | 709/227 |
| 2005/0017847 A1 * | 1/2005 | Bonicatto et al. | 340/310.01 |

(Continued)

*Primary Examiner* — Juan A Torres
(74) *Attorney, Agent, or Firm* — Crawford Maunu PLLC

(57) ABSTRACT

Methods, systems, and apparatus, including computer programs encoded on a computer storage medium, for communicating using harmonic tones. In one aspect, a method includes receiving harmonic tones that represent data being reported by a node that generated the harmonic tones; selecting data that are represented by each of the harmonic tones; and providing the data that are represented by the harmonic tones.

19 Claims, 5 Drawing Sheets

(56) References Cited

U.S. PATENT DOCUMENTS

| | | | |
|---|---|---|---|
| 2005/0020232 A1* | 1/2005 | Bonicatto et al. | 455/402 |
| 2005/0055586 A1* | 3/2005 | Flen et al. | 713/300 |
| 2005/0083925 A1* | 4/2005 | Bonicatto et al. | 370/389 |
| 2005/0231039 A1* | 10/2005 | Hunt | 307/66 |
| 2008/0165727 A1* | 7/2008 | Xiaoben et al. | 370/329 |
| 2008/0215268 A1* | 9/2008 | Bonicatto et al. | 702/66 |
| 2008/0304595 A1 | 12/2008 | Haug et al. | |
| 2009/0110121 A1* | 4/2009 | Bonicatto et al. | 375/340 |
| 2009/0184835 A1* | 7/2009 | Deaver et al. | 340/660 |
| 2009/0187285 A1* | 7/2009 | Yaney et al. | 700/292 |
| 2010/0111199 A1* | 5/2010 | Sharma | 375/257 |
| 2011/0121952 A1 | 5/2011 | Bonicatto et al. | |
| 2011/0176598 A1 | 7/2011 | Kohout et al. | |
| 2011/0218686 A1 | 9/2011 | McHann, Jr. et al. | |
| 2011/0249678 A1 | 10/2011 | Bonicatto et al. | |
| 2012/0039403 A1* | 2/2012 | Callaway, Jr. | 375/259 |
| 2012/0057592 A1 | 3/2012 | Zeppetelle et al. | |
| 2012/0076212 A1 | 3/2012 | Zeppetelle et al. | |
| 2012/0084559 A1 | 4/2012 | Bonicatto | |
| 2012/0106664 A1 | 5/2012 | Bonicatto et al. | |

\* cited by examiner

HARMONIC TRANSMISSION OF DATA

CROSS-REFERENCE TO RELATED APPLICATIONS

This application claims the benefit under 35 U.S.C. §119(e) of U.S. Patent Application No. 61/387,061, entitled "HARMONIC TRANSMISSION OF DATA," filed Sep. 28, 2010, which is incorporated herein by reference in its entirety.

BACKGROUND

This specification relates to data communications.

Service providers utilize distributed networks to provide services to customers over large geographic areas. For example, communications companies utilize a distributed communications network to provide communications services to customers. Similarly, power companies utilize a network of power lines and meters to provide power to customers throughout a geographic region and receive data back about the power usage.

These service providers are dependent on proper operation of their respective networks to deliver services to the customers and receive data back regarding the services provided. For example, the service provider may want access to daily usage reports to efficiently bill their customers for the resources that are consumed or otherwise utilized by the customers. Therefore, it is important for data specifying resource utilization and other information to be reliably transmitted and/or received at specified intervals.

In power line communication networks, nodes in the network (e.g., meters) can provide updated information (e.g., power consumption information and/or node operating status information) by transmitting data over power lines. Generally, the meters utilize modulation techniques to encode multiple bits of data into the transmissions, thereby increasing the amount of data that can be provided over the power lines. For example, a node can use Quadrature Phase Shift Keying modulation to provide two bits of data. Similarly, a node can use 16 Quadrature Amplitude Modulation to provide four bits of data.

When modulation techniques (or other techniques) are used to encode data, error detection/correction techniques, such as forward error correction and automatic repeat request can be used to detect errors in the received data. For example, forward error correction can insert additional information (e.g., error-correcting code) into the data transmission to facilitate reconstruction of data that was most likely transmitted. Automatic repeat request inserts an error detection code that is used by the receiver to determine whether the received data is valid. When the data is invalid, the receiver requests retransmission of the data.

Each of these error detection/correction techniques require insertion of additional data (i.e., overhead) into the data stream, such that less bandwidth is available to transmit payload data (i.e., the data being reported by a node in the network). If the overhead transmitted through the network can be reduced, more data can be transmitted using the same bandwidth, and recovery of the payload data can be performed using less processing than that used to recover data that is transmitted with error detection/correction overhead data.

SUMMARY

In general, one innovative aspect of the subject matter described in this specification can be embodied in methods that include the actions of transmitting, by a node, harmonic tones over a power line communication system, at least one of the harmonic tones representing a data word including two or more bits of data; receiving, by a receiver, the harmonic tones; determining, by the receiver, data that are represented by each of the harmonic tones; and providing, by the receiver, the data that are represented by the harmonic tones. Other embodiments of this aspect include corresponding systems, apparatus, and computer programs, configured to perform the actions of the methods, encoded on computer storage devices.

Another innovative aspect of the subject matter described in this specification can be embodied in methods that include the actions of receiving, by a receiver, harmonic tones that represent data being communicated by a node that generated the harmonic tones; identifying, by a data processing apparatus, data that are represented by the received harmonic tones, the data being identified based on a tone-event-key that specifies data strings and harmonic tones that represent the data strings; and providing, by the data processing apparatus, the data that are represented by the received harmonic tones. Other embodiments of this aspect include corresponding systems, apparatus, and computer programs, configured to perform the actions of the methods, encoded on computer storage devices.

Embodiments can optionally include one or more of the following features. Methods can include one or more of the actions of determining that the received harmonic tones include a harmonic tone that is a data word delineator; and identifying, based on the data word delineator, a set of sequentially received harmonic tones that represent a data word. Identifying data that are represented by the received harmonic tones can include identifying the data word that is represented by the sequentially received harmonic tones. Providing the data that are represented by the received harmonic tones can include providing at least one data word that is formed by the data represented by the sequentially received harmonic tones.

Determining that the received harmonic tones include a data word delineator can include determining that one of the harmonic tones is one of a start tone or a stop tone. Identifying a set of sequentially received harmonic tones that represent a data word can include identifying harmonic tones that are sequentially received following the start tone or sequentially received prior to the stop tone. Identifying a set of sequentially received harmonic tones can include identifying a set of sequentially received harmonic tones that are sequentially received between start tone and stop tone pair.

Methods can further include the action of determining that the harmonic tones are being received from a node that transmits offset harmonic tones, where the offset harmonic tones are harmonic tones that have a frequency offset relative to the harmonic tones that represent the data being communicated using the offset harmonic tones. Identifying data that are represented by the received harmonic tones can include identifying the data that are represented by harmonic tones having a frequency that differs from the frequency of the offset harmonic tones, wherein the frequency difference is proportional to the frequency offset.

Determining that the harmonic tones are being received from a node that transmits offset harmonic tones can include determining that the received harmonic tones include an offset tone that specifies the frequency offset being used by the node. The received harmonic tones can include a plurality of offset tones that each specifies a different offset being used for different portions of the received harmonic tones. Identifying data that are represented by the received harmonic tones can include determining network operating characteristics that are being communicated with the harmonic tones.

Methods can further include the action of filtering the received harmonic tones to remove harmonic distortion prior to identifying the data that are represented by the received harmonic tones.

Particular embodiments of the subject matter described in this specification can be implemented so as to realize one or more of the following advantages. Bandwidth, power, and processing resources required to transmit and/or receive data over a network can be reduced by transmitting harmonic tones that are representative of data being communicated, but may not include all of the data being communicated, rather than transmitting encoded data over a network. Tone offsets can increase the security of data communications by requiring knowledge of both a tone-data index and the tone offset.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Harmonic tones that are used to represent data are transmitted over a power line communications network. In some implementations, nodes in the network can use different chords (i.e., two or more harmonic tones) as well as individual harmonic tones (audible or inaudible) and other combinations of audible and inaudible tones to represent data (single bits or words) that is being transmitted. For example, the individual audible tone having a frequency of 261.626 Hz (i.e., middle C when referenced to A at 440 Hz) can be used to represent a single bit (e.g., 0 or 1), multiple bits (e.g., binary 101), or a particular event (e.g., a power outage). Similarly, the C-chord (i.e., the harmonic tones of C-E-G) can represent a multi-bit sequence of data (e.g., 10001001), or a particular event (e.g., a node memory failure). As used throughout this document, the term harmonic tone is used to refer to a set of one or more tones that are transmitted together, irrespective of whether the tones are audible or inaudible.

When a receiver detects a harmonic tone (e.g., the C-chord) the receiver can utilize a tone-event-key (e.g., a lookup table) to determine what data and/or event is being reported by a node. For example, in response to detecting the C-chord, the receiver can use a tone-event-key that includes an index of data and/or events that are represented by different harmonic tones to determine what data and/or event is being reported. Thus, the receiver can directly obtain the data represented by the harmonic tone without having to decode the tone and/or perform any error correction analysis on the tone. As described in more detail below, the ability to obtain sets of data using the received tone can facilitate higher data rates and more efficient data transfer through a network such as a power line communications network. Additionally, using harmonic tones can facilitate faster detection of network events (e.g., network outages and/or network restorations) than using other data encoding techniques.

The description that follows describes detection and analysis of harmonic tones by a harmonic analysis apparatus that is coupled to a substation processing unit. However, the modulation analysis apparatus can be an integral component of the substation processing unit. Additionally, the modulation analysis apparatus can also be implemented such that the modulation analysis apparatus is coupled to (or is an integral component of) a node, a network management system, or another data processing apparatus in a network.

Figure 1:
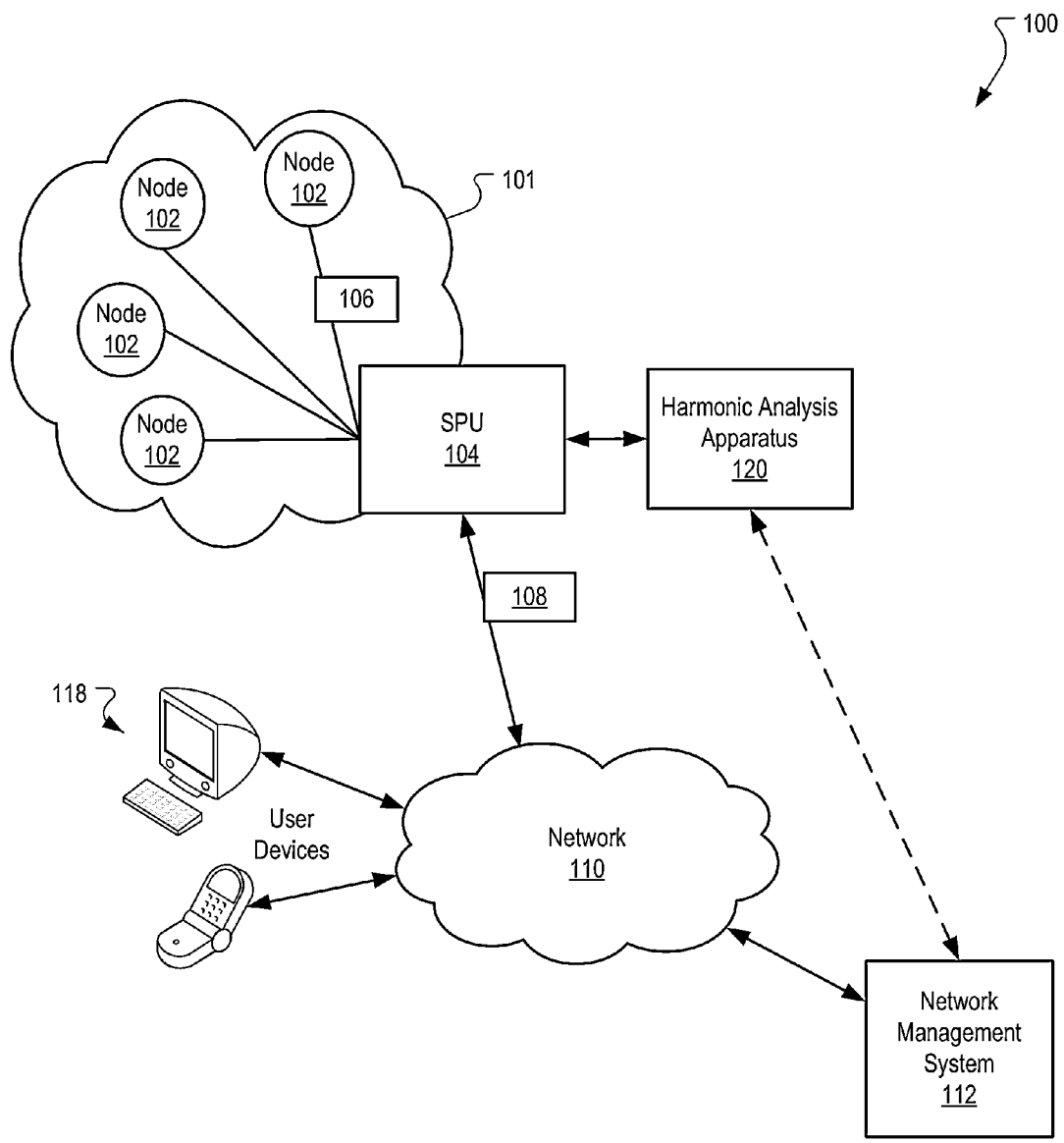
FIG. 1 is a block diagram of an example network environment in which nodes transmit harmonic tones.

FIG. 1 is a block diagram of an example network environment 100 in which nodes transmit harmonic tones. The network environment 100 includes a service network 101 in which a plurality of nodes 102 are coupled (e.g., communicatively coupled) to a substation processing unit 104. The nodes 102 can be any device capable of transmitting data in the network environment 100. For example, the nodes 102 can be meters (or other network elements such as switches) in a utility network, computing devices, television set top terminals or telephones that transmit data in the service network. The description that follows refers to the nodes 102 as power meters in a power distribution network. However, the description that follows is applicable to other types of nodes 102 in utility networks or other networks. For example, the description that follows is applicable to gas meters and water meters that are respectively installed in gas and water distribution networks. The description is also applicable with reference to any methods, apparatus, or systems that use harmonic tones to represent data.

The nodes 102 can be implemented to monitor and report various operating characteristics of the service network 101. For example, in a power distribution network, meters can monitor characteristics related to power usage in the network. Example characteristics related to power usage in the network include average or total power consumption, power surges, power drops and load changes, among other characteristics. In gas and water distribution networks, meters can measure similar characteristics that are related to gas and water usage (e.g., total flow and pressure).

The nodes 102 report the operating characteristics of the network over communications channels. Communications channels are portions of radio frequency spectrum over which data are transmitted. The center frequency and bandwidth of each communications channel can depend on the communications system in which they are implemented. In some implementations, the communications channels for utility meters (e.g., power, gas and/or water meters) can be implemented in power line communication (PLC) systems that dynamically allocate available bandwidth according to an orthogonal frequency division multiple access (OFDMA) spectrum allocation technique.

Using OFDMA each node 102 is assigned a subset of available data sub-carriers, such that multiple nodes can simultaneously transmit data over the service network 101, even when the nodes 102 are transmitting different harmonic tones. For example, one node can transmit a middle C tone (i.e., 261.626 Hz) on one channel, while another node can transmit the C-chord (i.e., the harmonic tones of C, E, and G) on another channel. A channel can be a single sub-carrier, a set of two or more contiguous sub-carriers, or a set of any one or more sub-carriers irrespective of their relative center frequencies. OFDMA is provided as an example spectrum allocation technique, but other allocation techniques can also be used (e.g., Time Division Multiple Access).

When the nodes 102 are implemented as power meters in a power distribution network, the harmonic tones transmitted by the power meters can represent measures of total power consumption, power consumption over a specified period of time, peak power consumption, instantaneous voltage, peak voltage, minimum voltage and other measures related to power consumption and power management (e.g., load information). Harmonic tones can also be used to represent status data that specifies a status of the power meter (e.g., operating in a normal operating mode, emergency power mode, or another state such as a power outage state). An example set of harmonic tones and the information (e.g., events and/or data) that each tone represents is provided in Table 1.

TABLE 1

| Harmonic Tone | Information Represented |
|---|---|
| C-Chord (i.e., harmonic tones C-E-G) | Normal Operating Status |
| Middle C (i.e., 261.626 Hz) | 101 (binary) |
| A above Middle C (i.e., 440 Hz) | 110 (binary) |

The example tones provided by Table 1 are audible harmonic tones, and are provided for purposes of example. Using harmonic tones that correspond to the circle of fifths provides a standardized set of harmonic tones and a standard progression of harmonic tones that can be used to represent data. Other sets of tones (i.e., tones at other frequencies) can be used to represent data.

In some implementations, tones representing operating characteristics (e.g., tones representing measures of power consumption and/or status data) are continuously or intermittently transmitted for a specified period. The specified period is a period of time over which a particular harmonic tone is transmitted. In some implementations, new tones representing updated and/or different operating characteristics can be sent at a rate that is proportional to a clock rate of the receiver that is receiving the harmonic tones. In other implementations, new tones can be transmitted at a specified rate that ensures the availability of updated operating characteristics as needed.

In some implementations, multiple harmonic tones can be sequentially transmitted over multiple specified periods (e.g., over multiple clock cycles) to transmit longer sets of data (e.g., data words) than those that are originally associated with the harmonic tones. For example, according to Table 1, middle C represents the data bits 101, and the A above middle C represents the data bits 110. In this example, the data word 101110 can be transmitted over two specified periods (e.g., clock cycles) by transmitting the middle C (i.e., 261.26 Hz) for one specified period and transmitting A above middle C (i.e., 440 Hz) for the second specified period. Thus, tones representing a 6-bit word can be transmitted over two specified periods using the two tones that each represents 3-bit words without using signal encoding techniques, such as modulation schemes, that may require additional power, additional sub-carriers, and processing resources to transmit a signal that is encoded with 3-6 bits of data. Larger data words can similarly be created by sequentially transmitting combinations of tones that represent these and other data words and/or individual data bits.

When multiple tones are used to create longer sets of data, standard word periods (e.g., a set of 10 contiguous tone periods), start tones, and/or stop tones can be used to delineate words of data. For example, a 10 kHz tone can be used as a word start tone, while a 20 kHz tone can be used as the stop tone. In this example, the two data words 101110 and 110101 can be transmitted by transmitting the following sequence of tones 10 kHz—middle C-A above middle C—20 kHz-10 KHz—A above middle C-middle C—20 kHz. In this example, a 20 kHz tone was used as a stop tone for the word 101110 and a 10 kHz tone followed as the start tone for the 110101 word. In some implementations, the start tone for the second word can also be used to signify the end of the word 101110, rather than using a separate stop tone.

In some implementations, tone offsets can be used to provide data security features. For example, each node can be assigned a particular offset, such that the tones transmitted by the node are not the tones that represent the data being reported by the node, but are offsets of the tones that represent the data being reported by the node. For example, assume that the tones being used by the transmitters and receivers are tones that are tuned according to the circle of fifths. Further assume that each node is assigned a particular offset, and a particular node is assigned an offset of +1. In this example, when the node transmits an F in a C-major scale (i.e., F-C-G-D-A-E-B), that F can be mapped to the data represented by an F-sharp in the G-major scale (C-G-D-A-E-B-F-sharp) because the G-major scale is one fifth higher (i.e., clockwise) on the circle of fifths and includes an F-sharp rather than an F. Therefore, even if the tones transmitted by the node are intercepted by a third party, the third party would have to determine the node's offset and obtain the tone-event-key to recover the data being reported by the node.

Each node can also use dynamic offsets that change over time. In these implementations, the nodes can insert an offset tone that specifies the offset being used by the node. In turn, the receiver can detect the offset tone to determine the offset being used by the node.

In some implementations, the nodes 102 transmit the tones representing the operating characteristics of the service network 101 over communications channels to a substation processing unit 104. The substation processing unit (SPU) 104 is a processing apparatus that receives communications from nodes 102 to manage the service network 101 or for transmission though a data network 110. For example, the SPU 104 can include a receiver that receives tones 106 from the nodes 102 and logs data that are represented by the tones 106. The SPU 104 can also take action based on the data that are represented by the tones 106 received from the nodes 102 and/or transmit the data to a network management system 112 that manages the service network 101. The SPU 104 can transmit the tones 106 or generate a consolidated packet 108 of data that includes data represented by the tones 106 received from multiple tones 106 that are received from the nodes 102.

The data network 110 can be a wide area network (WAN), local area network (LAN), the Internet, or any other communications network. The data network 110 can be implemented as a wired or wireless network. Wired networks can include any media-constrained networks including, but not limited to, networks implemented using metallic wire conductors, fiber optic materials, or waveguides. Wireless networks include all free-space propagation networks including, but not limited to, networks implemented using radio wave and free-space optical networks. While only one SPU 104 is shown, the service network 101 can include many different SPUs 104 that can each communicate with thousands of nodes 102.

In some implementations, the data network 110 couples the SPU 104 to the network management system 112. The network management system 112 is a system that monitors and/ or controls the service network 101. The network management system 112 can control different characteristics of the service network 101 based on data represented by the tones 106 received from nodes 102 that are installed in the service network 101. For example, in a PLC network, the network management system 112 allocates additional resources to a particular portion of the network (i.e., load balance), in response to obtaining data specifying that power usage is significantly higher in that particular portion of a power network than in other portions of the power network.

The network management system 112 can provide data represented by the received tones 106 to a user device 118 that can be accessed, for example, by the network operator, maintenance personnel and/or customers. For example, data identifying the increased power usage described above can be provided to a user device 118 accessible by the network operator, who can, in turn, determine an appropriate action regarding the increased usage. Similarly, if the data represented by the tones 106 (or lack thereof) indicate that there is a power outage, the network management system 112 can provide data to user devices 118 that are accessible by customers to provide information regarding the existence of the outage and potentially provide information estimating a duration of the outage. In some implementations, failure to receive an operating status tone (e.g., the C-chord from Table 1) over a threshold period of time (e.g., 4 minutes) can represent a power outage.

The SPU 104 and/or network management system 112 include a harmonic analysis apparatus 120 that detects harmonic tones 106 that are received from the nodes 102 and determines the data that are represented by the tones. In some implementations, the harmonic analysis apparatus 120 includes digital signal processors that detect the tones 106 that are received from the nodes 102. For example, the digital signal processors can be implemented to digitize the received tones and compare the digitized tones to data representing reference tones. Based on this comparison, the harmonic analysis apparatus 120 can select the reference tone that is matched by the received tone. In turn, the harmonic analysis apparatus 120 can select data (e.g., from the tone-event-key) that are represented by the received harmonic tones.

In some implementations, the harmonic analysis apparatus 120 can include filters that can be used to remove harmonic distortion that may be included in the received tones 106. For example, filters similar to those implemented to remove harmonic distortions from audio distribution systems can be implemented to remove harmonic distortions from the received tones, thereby increasing the reliability with which the tones are detected.

In some implementations, each node 102 can have a corresponding node identifier that uniquely identifies the node 102. The node identifier for the node can be, for example, a serial number, installation address, or another identifier. Each node identifier can be represented, for example, by a unique tone sequence. For example, the node that is associated with the node identifier "A1234567" can be represented by the following series of tones G-B-C-B-B-A (e.g., in C-major). Each set of tones (or a subset thereof) that are received from the nodes 102 can begin with the series of tones that represent the unique identifier of the node 102 that is transmitting the tones.

The harmonic analysis apparatus 120 can include, or be coupled to a data store that stores an index of node identifiers and the series of tones that represent the unique identifier. The data store can also store harmonic tones and associated data that are represented by the respective harmonic tones. Therefore, the harmonic analysis apparatus 120 can interact with the data store to determine the node from which tones are being received and information that is represented by the tones being received.

In some implementations, the harmonic tones and associated data are also indexed to a particular node identifier. In these implementations, each node 102 can have a unique set of tones that represent the information being reported by the node 102. For example, one node may use the C-chord to represent the binary word 101, while another node may use the C-chord to represent the binary word 111. Thus, the information represented by the C-chord will depend on the node from which the C-chord is received.

As described above, the tones received from the nodes 102 can include a data privacy tone that specifies a tone offset (i.e., a harmonic tone frequency offset) that the node 102 is using to transmit the data. In these implementations, the data store can also store an index of data privacy tones for each of the nodes, so that the harmonic analysis subsystem 120 can perform the appropriate tone offset that will result in recovery of the data being reported by the node 102.

Once the harmonic analysis system 120 has determined the node from which tones are received and the data represented by the received tones, the harmonic analysis system 120 can generate a data packet that represents the data represented by the received tones. For example, the data packet that is generated by the harmonic analysis system 120 can include a data header that identifies the node with which the data is associated and a data payload that specifies the operating characteristics being reported by the node 102. This data packet can be used, for example, by the substation processing unit to generate a status report, take specified actions, and/or perform additional analysis and processing (e.g., statistical analysis of the data over time). The data packet can also be provided, for example, to the network management system 112 for further processing.

Figure 2A:
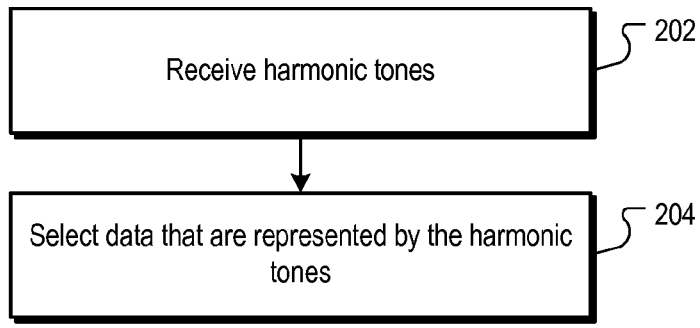
FIG. 2A is a flow chart of an example process for transmitting data using harmonic tones.

FIG. 2A is a flow chart of an example process 200 for transferring data using harmonic tones. The process 200 is a process by which tones are received by a data processing apparatus (202) and the data processing apparatus selects data that are represented by the tones (204). For example, the data processing apparatus can select the data from a data store that stores a tone-event-key or another index of tones and data that are represented by the tones.

The process 200 can be implemented, for example, by the harmonic analysis apparatus 120 and/or network management system 112 of FIG. 1. The process 200 can also be implemented by the endpoints 102. In some implementations, the harmonic analysis apparatus 120 includes one or more processors that are configured to perform actions of the process 200. In other implementations, a computer readable medium can include instructions that when executed by a computer cause the computer to perform actions of the process 200.

Figure 2B:
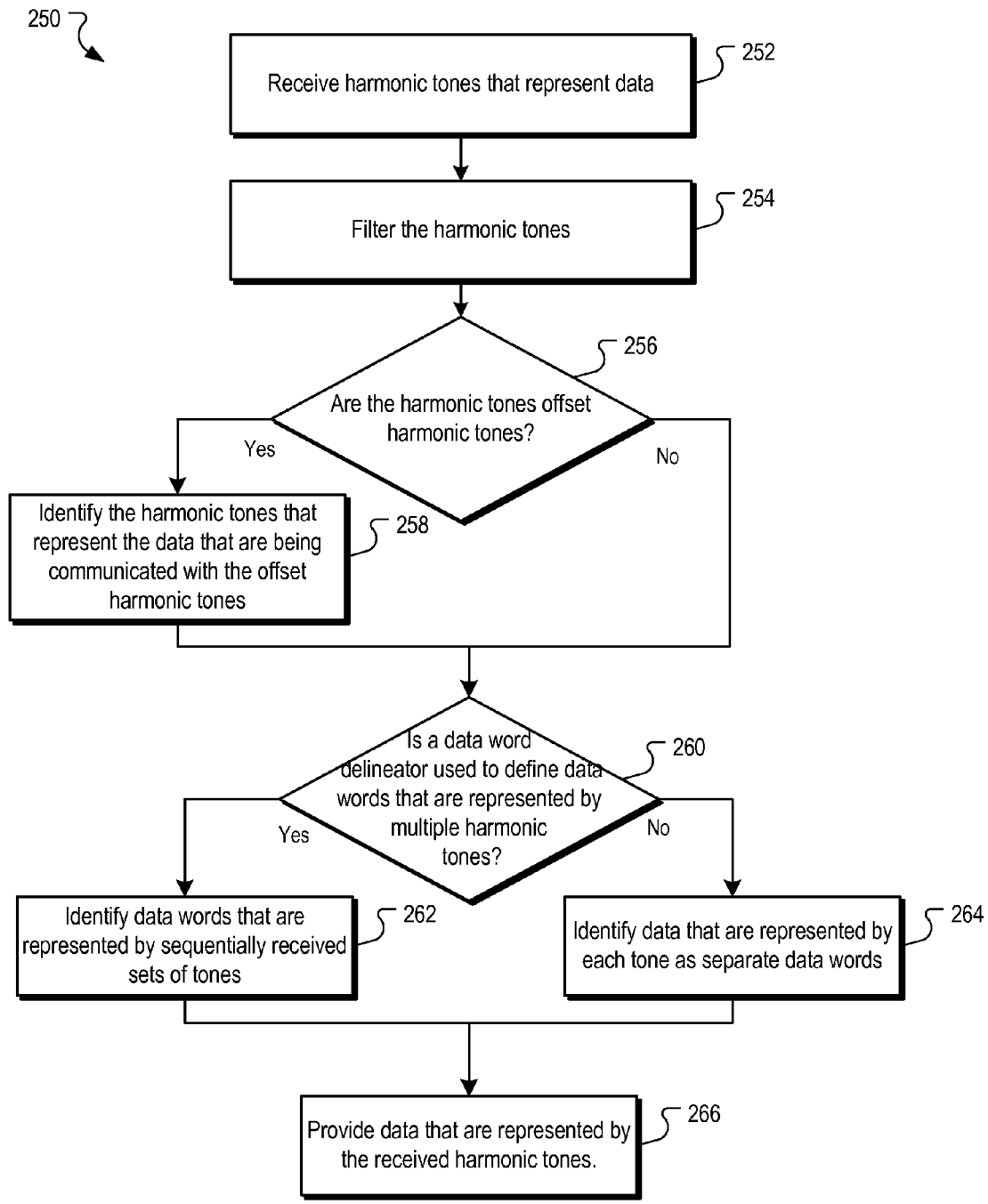
FIG. 2B is a flow chart of another example process for transmitting data using harmonic tones.

FIG. 2B is a flow chart of another example process 250 for transferring data using harmonic tones. The process 250 is a process by which harmonic tones that represent data are received and filtered, for example, to remove harmonic distortion. A determination is made whether the harmonic tones are offset tones (e.g., different tones than the harmonic tones that represent the data to be communicated). If the harmonic tones are not offset tones, a determination is made whether the harmonic tones include data word delineators. If the harmonic tones are offset tones, the harmonic tones that represent data being communicated with the offset harmonic tones are identified, and a determination is made whether the harmonic tones include data word delineators. If the harmonic tones include a data word delineator, data that are represented by sequentially received sets of tones are identified. Otherwise, data that are represented by each tone are identified, for example, independent of other tones. In turn, data that are represented by the received harmonic tones are provided, for example, to a data processing device that can process the data, and or a user device that can present the data.

The process 250 can be implemented, for example, by the harmonic analysis apparatus 120 and/or network management system 112 of FIG. 1. The process 250 can also be implemented by the endpoints 102. In some implementations, the harmonic analysis apparatus 120 includes one or more processors that are configured to perform actions of the process 250. In other implementations, a computer readable medium can include instructions that when executed by a computer cause the computer to perform actions of the process 250.

Harmonic tones that represent data are received by a receiver (252). In some implementations, the harmonic tones are received from a node that is using the harmonic tones to communicate data. For example, rather than encoding data bits into a carrier waveform (e.g., using data encoding and/or modulation techniques), a single harmonic tone (or a harmonic chord) alone can represent one bit of data, two bits of data, or longer strings of data.

For example, in a power line communications system, each node (e.g., meter) can be assigned a 3 harmonic tone (or harmonic chord) pattern that can be used to uniquely identify the endpoint. Similarly, a separate harmonic tone, harmonic chord, or pattern of harmonic tones and/or chords can be used to represent different node operating conditions. Thus, a node (e.g., a meter in a PLC network) can communicate (or report) a particular node operating condition by outputting the harmonic tone, harmonic chord, or pattern that represents the particular node operating condition, without being required to encode bits of data in a carrier waveform since the waveform itself represents the data.

Using harmonic tones to communicate data reduces the processing resources needed to transmit data across a network, as well as the resources required to determine the data that are being received from a node. For example, when harmonic tones are used to represent data that are being communicated, the system to which data are being communicated need only detect the harmonic tone that is being transmitted, rather than being required to recover data that have been encoded in a carrier waveform.

In some implementations, the received harmonic tones are filtered to remove harmonic distortion (254). For example, the received harmonic tones can be filtered using a harmonic distortion filter prior to identifying the data that are represented by the received harmonic tones. In some implementations, the received harmonic tones can be selectively filtered based on a measure of total harmonic distortion (or another measure of harmonic distortion). For example, if the total harmonic distortion for the received harmonic tones is less than a specified distortion threshold, the received harmonic tones may not be filtered, while the received harmonic tones may be filtered when the total harmonic distortion meets or exceeds the distortion threshold.

A determination is made whether the harmonic tones are offset harmonic tones (256). An offset harmonic tone is a harmonic tone that differs in frequency from a harmonic tone that represents the data that are being communicated by the node. For example, assume that a node is to report a particular set of data (e.g., data word 101) that are represented by a particular harmonic tone (e.g., Middle C at 261.626 Hz), and assume that this node communicates using offset harmonic tones (e.g., to securely communicate over the network). In this example, instead of outputting the particular harmonic tone (e.g., Middle C at 261.626 Hz) that actually represents the particular set of data (e.g., data word 101), the node may output an offset harmonic tone (e.g., A above Middle C at 440 Hz), which may represent a different set of data (e.g., data word 110) than that to be communicated. Thus, in order to identify the proper data being communicated by this node, a tone offset can be used to determine that when the offset harmonic tone is received from the node, the data being communicated are actually represented by the particular harmonic tone (e.g., Middle C at 261.626 Hz).

As described above with reference to FIG. 1, the offsets that are used by the transmitters and receivers in a network can be standardized such that integer offsets can represent the tone offsets that are used. For example, a standardized offset can be based on the circle of fifths with each fifth on the circle being represented by an integer value. Assume for this example that a particular node is assigned an offset of +1. In this example, when the node transmits an F in a C-major scale (i.e., F-C-G-D-A-E-B), that F can be mapped to the data represented by an F-sharp in the G-major scale (C-G-D-A-E-B-F-sharp) because the G-major scale is one fifth higher (i.e., clockwise) on the circle of fifths and includes an F-sharp rather than an F. Thus, the offset tone can be represented by integer values (or other reference values).

In some implementations, the tone offset (i.e., frequency offset) being used can be specified on a global basis (i.e., each node in the network uses a same frequency offset) or on a per-node basis (i.e., each node uses a distinct frequency offset). The tone offsets that are used by the nodes can also be static or dynamic. For example, a particular node (or group of nodes) may consistently use a same tone offset, or may change the tone offset being used dynamically. For example, a node may adjust the tone offset being used on a daily or weekly basis. The node can also adjust the tone offset being used for each data bit or data word that is being transmitted.

In some implementations, the tone offset being used by a node is specified by an offset tone that is included in the harmonic tones that are received from the node. The offset tone is a harmonic tone that specifies the tone offset (i.e., a frequency offset that is being used for the received harmonic tones). As described above with reference to FIG. 1, the offset tone can be detected by the device that is receiving the harmonic tones, and in turn, used to determine the tone offset that is being used. Thus, the determination of whether offset harmonic tones are being used can be determined based on whether offset tones are included in the received harmonic tones and/or whether a global offset has been assigned (e.g., by a network administrator). In some implementations, both global and node specific tone offsets can be used, and the sum, difference, or another function of the offset tones can be used to determine the offset (i.e., frequency difference) being used.

When it is determined that the received harmonic tones are offset harmonic tones, the harmonic tones that represent the data being communicated by the node are identified (258). As described above, the harmonic tones that represent the data being communicated can be identified using the tone offset that is being used by the node. In turn, the harmonic tone that represents the data being communicated can be identified as the harmonic tone that is at the frequency that results from a combination (i.e., a function) of the offset harmonic tone and the tone offset. The result from the combination of the offset harmonic frequency and the offset tone can be a result of a sum, difference, or another function (e.g., a multiple) of the offset harmonic frequency and the offset tone.

A determination is made whether a data word delineator defines data words that are represented by multiple harmonic tones (260). In some implementations, the data word delineator is represented by a harmonic tone that has been defined as a word delineator and is included in the received harmonic tones. For example, as described above with reference to FIG. 1, a start tone that is indicative of a start of a data word, and a stop tone that is indicative of the end of a data word can be defined. If either (or both) of the start tone or stop tone is determined to be included (e.g., detected) in the received harmonic tones, it is determined that a data word delineator defines data words that are represented by multiple harmonic tones. In some implementations, if neither of the start tone nor the stop tone are determined to be included (e.g., detected) in the received harmonic tones it may be determined that a data word delineator does not define data words that are represented by multiple harmonic tones.

In some implementations, data word delineators other than start tones and stop tones may be used. For example, as described above, the data word delineators may be time based, such that the harmonic tones that are received over a specified number of periods (e.g., a specified number of clock cycles), may be grouped together in a data word. Thus, system clock transitions can be used as data word delineators for multiple received harmonic tones. In these implementations, identifying that that the node from which the harmonic signals are received uses time based data word delineation can constitute determining that the received harmonic tones include a data word delineator.

When it is determined that a data word delineator is being used, the data words are identified from sets of sequentially received sets of tones (262). As described above with reference to FIG. 1, the data words can be formed by identifying data that are represented by the harmonic tones that are received after a start tone and/or prior to a stop tone and using the data that are represented by these harmonic tones to form the data words.

When it is determined that a data word delineator is not being used, the data that are represented by each harmonic tone are identified as separate data words (264). For example, as described with reference to FIG. 1, using a tone-event-key (or another index in which data are indexed to harmonic tones), the data that are represented by each harmonic tone can be identified and considered to be a separate data word.

Data that are represented by the received harmonic tones are provided (266). For example, the data can be provided to a data processing apparatus that performs operations using the data. The data can also be provided for presentation at a user device. For example, the actual data that are represented by the harmonic tones and/or operating characteristics of a network (or other information) that are represented by the actual data can be presented.

Figure 3:
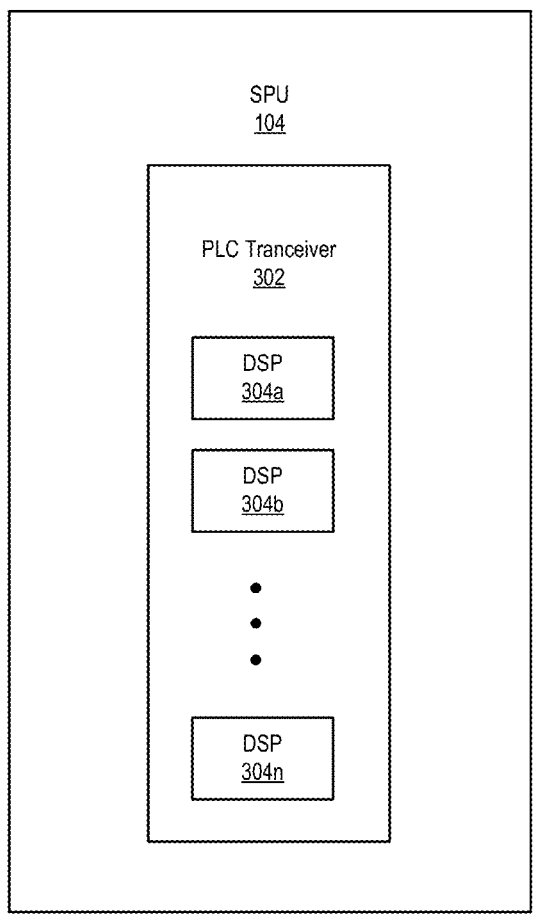
FIG. 3 is a block diagram of an example substation procession unit that can receive harmonic tones over a power line communication network.

FIG. 3 is a block diagram of an example SPU 104 that can receive harmonic tones over a power line communication network. The substation processing unit 104 may be coupled to or otherwise in communication with thousands of different nodes, and be configured to communicate with the nodes in a unidirectional and/or bidirectional manner.

The substation processing unit 104 includes a PLC transceiver 302 and signal processors 304a-304n. The PLC transceiver 302 can communicate with each node individually by sending and/or receiving signals in a particular channel or frequency assigned to a node, as described above. For example, the PLC transceiver 302 can receive and translate transmissions (e.g., determine data associated with tones) received from nodes in a PLC network. The PLC transceiver 302 can also transmit tones and/or other data to the nodes in the PLC network.

The signal processors 304a-304n can be configured to receive, filter, and/or separate received transmissions into one or more channels that are assigned to the various nodes. For example, each signal processor 304 can filter the transmissions that are received by the PLC transceiver to extract transmissions that are received over a set of channels that have been assigned to the signal processor 304. In turn, the extracted transmissions can be processed to decode the extracted transmissions (e.g., determine data associated with tones), or the extracted transmissions can be provided to other signal processors 304 that can further extract transmissions of one or more channels in the set of channels that are included in the previously extracted transmissions.

Figure 4:
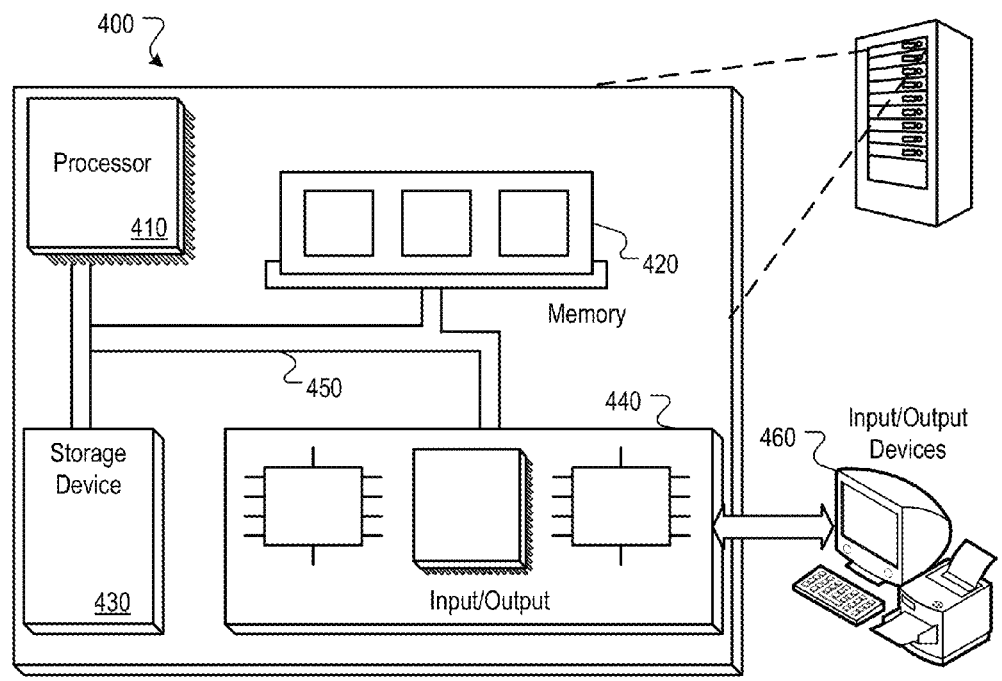
FIG. 4 is a block diagram of an example computer system that can be used to facilitate transmission of data using harmonic tones.

FIG. 4 is a block diagram of an example computer system 400 that can be used to facilitate transmission of data using harmonic tones. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can include, for example, a hard disk device, an optical disk device, or some other large capacity storage device.

The input/output device 440 provides input/output operations for the system 400. In one implementation, the input/output device 440 can include one or more of a network interface device, e.g., an Ethernet card, a serial communication device, e.g., a RS-232 port, and/or a wireless interface device, e.g., an 802.11 card. In another implementation, the input/output device can include driver devices configured to receive input data and send output data to other input/output devices, e.g., keyboard, printer and display devices 460. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them.

Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by a data processing apparatus, the method comprising:
    receiving over a power line, by a receiver, harmonic tones that represent data being communicated by a node that generated the harmonic tones;
    identifying, by the data processing apparatus, data that are represented by the received harmonic tones, the data being identified based on a tone-event-key that specifies data strings and harmonic tones that represent the data strings; and
    providing, by the data processing apparatus, the data that are represented by the received harmonic tones.

2. The method of claim 1, further comprising:
    determining that the received harmonic tones include a harmonic tone that is a data word delineator; and
    identifying, based on the data word delineator, a set of sequentially received harmonic tones that represent a data word, wherein:
        identifying data that are represented by the received harmonic tones comprises identifying the data word that is represented by the sequentially received harmonic tones; and
        providing the data that are represented by the received harmonic tones comprises providing at least one data word that is formed by the data represented by the sequentially received harmonic tones.

3. The method of claim 1, further comprising:
    determining that the harmonic tones are being received from a node that transmits offset harmonic tones, where the offset harmonic tones are harmonic tones have a frequency offset relative to the harmonic tones that represent the data being communicated using the offset harmonic tones, wherein
    identifying data that are represented by the received harmonic tones comprises identifying the data that are represented by harmonic tones having a frequency that differs from the frequency of the offset harmonic tones, wherein the frequency difference is proportional to the frequency offset.

4. The method of claim 1, wherein identifying data that are represented by the received harmonic tones comprises determining network operating characteristics that are being communicated with the harmonic tones.

5. The method of claim 1, further comprising filtering the received harmonic tones to remove harmonic distortion prior to identifying the data that are represented by the received harmonic tones.

6. The method of claim 2, wherein:
    determining that the received harmonic tones include a data word delineator comprises determining that one of the harmonic tones is one of a start tone or a stop tone; and
    identifying a set of sequentially received harmonic tones that represent a data word comprises identifying harmonic tones that are sequentially received following the start tone or sequentially received prior to the stop tone.

7. The method of claim 3, wherein determining that the harmonic tones are being received from a node that transmits offset harmonic tones comprises determining that the received harmonic tones include an offset tone that specifies the frequency offset being used by the node.

8. The method of claim 6, wherein identifying a set of sequentially received harmonic tones comprises identifying a set of sequentially received harmonic tones that are sequentially received between the start tone and stop tone pair.

9. The method of claim 7, wherein the received harmonic tones include a plurality of offset tones that each specify a different offset being used for different portions of the received harmonic tones.

10. A non-transitory computer storage medium encoded with a computer program, the program comprising instructions that when executed by a data processing apparatus causes the data processing apparatus to perform operations comprising:
    receiving over a power line, by a receiver, harmonic tones that represent data being communicated by a node that generated the harmonic tones;
    identifying, by the data processing apparatus, data that are represented by the received harmonic tones, the data being identified based on a tone-event-key that specifies data strings and harmonic tones that represent the data strings; and
    providing, by the data processing apparatus, the data that are represented by the received harmonic tones.

11. A system, comprising:
    a plurality of nodes implemented in a power-line communication network; and
    a data processing apparatus that is configured to interact with the plurality of nodes, the data processing apparatus being further configured to perform operations including:
        receiving over a power line, by a receiver, harmonic tones that represent data being communicated by a node that generated the harmonic tones;

identifying, by the data processing apparatus, data that are represented by the received harmonic tones, the data being identified based on a tone-event-key that specifies data strings and harmonic tones that represent the data strings; and providing, by the data processing apparatus, the data that are represented by the received harmonic tones.

12. The system of claim 11, wherein the data processing apparatus is further configured to perform operations including:

determining that the received harmonic tones include a harmonic tone that is a data word delineator; and identifying, based on the data word delineator, a set of sequentially received harmonic tones that represent a data word, wherein:

identifying data that are represented by the received harmonic tones comprises identifying the data word that is represented by the sequentially received harmonic tones; and providing the data that are represented by the received harmonic tones comprises providing at least one data word that is formed by the data represented by the sequentially received harmonic tones.

13. The system of claim 11, wherein the data processing apparatus is further configured to perform operations including:

determining that the harmonic tones are being received from a node that transmits offset harmonic tones, where the offset harmonic tones are harmonic tones have a frequency offset relative to the harmonic tones that represent the data being communicated using the offset harmonic tones; and identifying the data that are represented by harmonic tones having a frequency that differs from the frequency of the offset harmonic tones, wherein the frequency difference is proportional to the frequency offset.

14. The system of claim 11, wherein the data processing apparatus is further configured to perform operations including determining network operating characteristics that are being communicated with the harmonic tones.

15. The system of claim 11, wherein the data processing apparatus is further configured to perform operations including filtering the received harmonic tones to remove harmonic distortion prior to identifying the data that are represented by the received harmonic tones.

16. The system of claim 12, wherein the data processing apparatus is further configured to perform operations including:

determining that one of the harmonic tones is one of a start tone or a stop tone; and identifying harmonic tones that are sequentially received following the start tone or sequentially received prior to the stop tone.

17. The system of claim 13, wherein the data processing apparatus is further configured to perform operations including determining that the received harmonic tones include an offset tone that specifies the frequency offset being used by the node.

18. The system of claim 16, wherein the data processing apparatus is further configured to perform operations including identifying a set of sequentially received harmonic tones that are sequentially received between the start tone and stop tone pair.

19. The system of claim 17, wherein the received harmonic tones include a plurality of offset tones that each specify a different offset being used for different portions of the received harmonic tones.

* * * * *

UNITED STATES PATENT AND TRADEMARK OFFICE
CERTIFICATE OF CORRECTION

Page 1 of 1

PATENT NO. : 8,675,779 B2
APPLICATION NO. : 13/075953
DATED : March 18, 2014
INVENTOR(S) : Zeppetelle et al.

It is certified that error appears in the above-identified patent and that said Letters Patent is hereby corrected as shown below:

In the Claims

Col. 16, line 4, Claim 3: "tones have a" should read --tones having a--.

Col. 17, line 29, Claim 13: "tones have a" should read --tones having a--.

Signed and Sealed this
Thirty-first Day of March, 2015

Michelle K. Lee
*Director of the United States Patent and Trademark Office*